(12) United States Patent
Christensen

(10) Patent No.: US 7,546,152 B2
(45) Date of Patent: Jun. 9, 2009

(54) PORTABLE SWIVEL-FOLD ELECTRONIC DEVICE WITH OFFSET SWIVEL

(75) Inventor: Claus Allan Christensen, Øresundsvej (DK)

(73) Assignee: Nokia Corporation, Espoo (FI)

( * ) Notice: Subject to any disclaimer, the term of this patent is extended or adjusted under 35 U.S.C. 154(b) by 406 days.

(21) Appl. No.: 11/356,841

(22) Filed: Feb. 17, 2006

(65) Prior Publication Data

US 2007/0192990 A1   Aug. 23, 2007

(51) Int. Cl.
*H04M 1/00* (2006.01)
*H04B 1/38* (2006.01)

(52) U.S. Cl. .................. 455/575.3; 455/550.1; 455/566

(58) Field of Classification Search ............. 455/550.1, 455/556, 575.3, 575.1; 348/14.02; 361/683, 361/681, 733; 345/5
See application file for complete search history.

(56) References Cited

U.S. PATENT DOCUMENTS

| | | | |
|---|---|---|---|
| 6,549,789 B1 * | 4/2003 | Kfoury | 455/550.1 |
| 2003/0078069 A1 * | 4/2003 | Lindeman | 455/550 |
| 2005/0136970 A1 * | 6/2005 | Kim | 455/550.1 |
| 2007/0192990 A1 * | 8/2007 | Christensen | 16/221 |

* cited by examiner

*Primary Examiner*—Charles N Appiah
*Assistant Examiner*—Kiet Doan
(74) *Attorney, Agent, or Firm*—Harrington & Smith PC

(57) ABSTRACT

A portable electronic device is provided including a first section having at least one key; and a second section pivotally connected to the first section by a movable connection, the second section having a display on a first side of the second section. The movable connection comprises a pivotal connection and a swivel connection. The pivotal connection comprises a first fold axis, wherein the first section and the second section are adapted to rotate relative to each other about the first fold axis. The swivel connection comprises a second offset swivel axis which is offset from a centerline of the second section, wherein the first section and the second section are adapted to rotate relative to each other about the second offset swivel axis. The swivel axis being offset from a centerline of the second section enables the device to achieve two different closed states, a first closed state in which the display on the first side of the second section faces an interior of the device, and a second closed state in which the display is visible, facing outwards from the device. At least a portion of the at least one key is accessible for use in conjunction with the display when the device is in the second closed state, in accord with aspects of the device's design and purpose.

17 Claims, 8 Drawing Sheets

PORTABLE SWIVEL-FOLD ELECTRONIC DEVICE WITH OFFSET SWIVEL

TECHNICAL FIELD

The invention relates to a portable electronic device and, more specifically, to a folding portable electronic device.

BACKGROUND OF THE INVENTION

Conventional fold electronic devices, also known as flip devices or clamshell devices, are basically opening monoblocks. The mechanical movement does not have a significant effect on the device's behavior. Opening the device reveals its primary display screen and at least one set of keys, thus enabling a user to operate the device. When closed, the primary display screen and set of keys are covered, protecting them, but also rendering them inaccessible and unusable.

FIGS. 1 and 2 illustrate a conventional prior art portable electronic device design. The device pictured in FIGS. 1 and 2 is a mobile phone 1. FIG. 1 is a perspective view of the mobile phone 1 in a first open state. The mobile phone 1 comprises two sections 2, 3 coupled together by a hinge assembly 4. The hinge assembly 4 enables the two sections 2, 3 to fold together along a fold axis 5, thus enabling the mobile phone 1 to achieve a closed state (see FIG. 2). While in the first open state, as depicted in FIG. 1, the various features of the two sections 2, 3 are accessible. Note that most conventional portable electronic devices similar to the mobile phone 1 depicted in FIG. 1 have an angle greater than 90 degrees between the two sections 2, 3 when in an open state. Mobile phone 1 is simply an exemplar. The first section 2 comprises two sets of keys 6, 7, a side key 8, and a sound input 9. The two sets of keys 6, 7 include a set of control keys 6 and a set of alphanumeric keys 7. The set of control keys 6 are usually used to control the operations of the mobile phone 1. The set of alphanumeric keys 7 are typically employed when inputting information into the mobile phone 1. The information can include, but is not limited to, phone numbers and alphanumeric text, such as contact names associated with phone numbers or text messages. The side key 8 usually has a specific, limited function, such as volume control for example. The two sets of keys 6, 7 are located on a first face 10 of the first section 2. The side key 8 is located on a second face 11 of the first section 2 and the second face 11 is orthogonal to the first face 10. The sound input 9 is where the mobile phone 1 picks up sound to enable voice interaction or voice communication over the mobile phone 1, typically through a microphone located near or at sound input 9. The second section 3 comprises a primary display screen 12, a sound output 13, and an antenna 14. The primary display screen 12 and the sound output 13 are located on a first face 15 of the second section 3. A second face 16 of the second section 3 is located opposite the first face 15 and can be seen more clearly in FIG. 2. The sound output 13 is where the mobile phone 1 emits sound in accord with aspects of its design. The sounds emitted by the sound output 13 can include, but are not limited to, voices from phone calls, alerts for text messaging, voice mail, and incoming calls, web surfing sounds, and sounds from game playing. Typically a speaker is located near or at the sound output 13.

FIG. 2 is a perspective view of the mobile phone 1 of FIG. 1 in a first closed state. As noted above, the mobile phone 1 achieved the first closed state by having the two sections 2, 3 fold together along fold axis 5, so enabled by the hinge assembly 4. In achieving the closed state, the first face 10 of the first section 2 now lies against the first face 15 of the second section 3 and the second face 16 of the second section 3 is now visible. Located on the second face 16 of the second section 3 is a secondary display screen 17. The secondary display screen 17 is typically used for such features as showing the current time, alerting the user when a voice mail has been left, or displaying caller ID information about incoming calls. Note that the side key 8 is also visible as it is located on the second face 11 of the first section 2. Note that when in the first closed state, the two sets of keys 6, 7 and the primary display screen 12 are inaccessible to a user as they are on faces that now look toward an interior of the mobile phone 1, the first face 10 of the first section 2 and the first face 15 of the second section 3, respectively.

If the mobile phone 1 is in a first closed state (FIG. 2) and a user desires to operate the mobile phone 1 in accord with its design, the user must first transform the mobile phone 1 from the first closed state (FIG. 2) into a first open state (FIG. 1). This enables a user to access the two sets of keys 6, 7, primary display screen 12, sound input 9, and sound output 13. If making a phone call, a user will utilize all four of these components. If using the mobile phone 1 for another purpose, such as text messaging, web surfing, game playing, or secretarial tasks, a user will likely only interact with the sets of keys 6, 7 and the primary display screen 12. Note that the side key 8 and the secondary display screen 17 are usually not employed when using the mobile phone 1 for primary purposes, such as phone calls, text messaging, web surfing, game playing, and secretarial tasks.

Another, more recent design for clamshell electronic devices incorporates an additional swivel axis about which one section of the device may rotate. The swivel axis is located along a longitudinal centerline of the device. This type of design enables a user to swivel the section containing the display screen in order to conveniently position it. In addition, this design may allow a user to see the primary display screen even when the device is in a closed state. However, this design still does not allow a user to access the set of keys when the device is in a closed state. Thus, a user may not fully operate the device in a closed state.

FIGS. 3 and 4 illustrate another conventional prior art portable electronic device design. The device pictured in FIGS. 3 and 4 is a mobile phone 21. Unlike the mobile phone 1 pictured in FIGS. 1 and 2, the mobile phone 21, as shown in FIGS. 3 and 4, has a second axis about which the second section of the mobile phone 21 may move with respect to the first section. This aspect can be seen more clearly in FIGS. 3 and 4, as discussed below.

FIG. 3 is a perspective view of the mobile phone 21 in a first open state. The mobile phone 21 comprises two sections 22, 23 coupled together by a hinge assembly 24. The hinge assembly 24 enables the two sections 22, 23 to fold together along a first fold axis 25, thus enabling the mobile phone 21 to achieve a closed state. While in the first open state, as depicted in FIG. 3, the various features of the two sections 22, 23 are accessible. The first section 22 comprises two sets of keys 26, 27, a side key 28, and a sound input 29. The two sets of keys 26, 27 include a set of control keys 26 and a set of alphanumeric keys 27. The set of control keys 26 are usually used to control the operations of the mobile phone 21. The set of alphanumeric keys 27 are typically employed when inputting information into the mobile phone 21. The information can include, but is not limited to, phone numbers and alphanumeric text, such as contact names associated with phone numbers or text messages. The side key 28 usually has a specific, limited function, such as volume control. Note that the two sets of keys 26, 27 are located on a first face 30 of the first section 22. Note also that the side key 28 is located on a second face 31 of the first section 22, where the second face 31 is orthogonal to the first face 30. The sound input 29 is where the mobile phone 21 picks up sound to enable voice interaction or voice communication over the mobile phone 21, typically through a microphone located near or at sound input 29. The second section 23 comprises a primary display screen 32, a sound output 33, and an antenna 34. The primary display screen 32 and the sound output 33 are located on a first face 35 of the second section 23. A second face 36 of the second section 23 is located opposite the first face 35. The sound output 33 is where the mobile phone 21 emits sound in accord with aspects of its design. The sounds emitted by the sound output 33 can include, but are not limited to, voices from phone calls, alerts for text messaging, voice mail, and incoming calls, web surfing sounds, and sounds from game playing. Typically a speaker is located near or at the sound output 33.

In contrast to the mobile phone 1 shown in FIG. 1, the mobile phone 21 in FIG. 3 features a second swivel axis 37 about which the second section 23 may move with respect to the first section 22. The second swivel axis 37 enables a user to rotate the second section 23 to angle the primary display screen 32 into a more convenient position.

The second swivel axis 37 also enables the mobile phone 21 to achieve two closed states instead of one. A first closed state of the mobile phone 21 is similar to the first closed state of the mobile phone 1 pictured in FIG. 2. The first face 30 of the first section 22 lies against the first face 35 of the second section 23 such that the primary display screen 32 and two sets of keys 26, 27 face an interior of the mobile phone 21. The mobile phone 21 achieves the first closed state (similar to FIG. 2) from the first open state shown in FIG. 3 in a similar manner as mobile phone 1 achieves its first closed state (FIG. 2) from its first open state (FIG. 1). The two sections 22, 23 of the mobile phone 21 fold together along the first fold axis 25, so enabled by the hinge assembly 24. In the first closed state, the primary display screen 32 and two sets of keys 26, 27 are inaccessible, preventing a user from operating the mobile phone 21 in accord with aspects of its design. The second closed state of the mobile phone 21 is as shown in FIG. 4 and is discussed below. Note that in the mobile phone 21, the second swivel axis 37 is located along a longitudinal centerline 38 of the second section 23 and a longitudinal centerline of the first section 22.

FIG. 4 is a perspective view of the mobile phone 21 of FIG. 3 in a second closed state. In the second closed state, the first face 30 of the first section 22 lies against the second face 36 of the second section 23. While the sets of keys 26, 27 are covered and inaccessible, the primary display screen 32 is accessible as the first face 35 of the second section 23 faces outwards from the mobile phone 21. To achieve the second closed state of FIG. 4, the mobile phone 21 is manipulated in a different manner than the mobile phone 1 of FIGS. 1 and 2. After at least partially unfolding the two sections 22, 23 along the first fold axis 25, the second section 23 is rotated along the second swivel axis 37 such that the first face 35 of the second section 23 faces about opposite from the relative direction the first face 15 of the second section 3 is shown facing in FIG. 1 with respect to the first section 2. That is, the second section 23 of mobile phone 21 is rotated about the second swivel axis 37 such that folding the two sections 22, 23 together about the first fold axis 25 results in the first face 30 of the first section 22 lying against the second face 36 of the second section 23. As can be observed in FIG. 4, in the second closed state of the mobile phone 21, the primary display screen 32 is accessible although the sets of keys 26, 27 remain inaccessible. In such a manner, although the mobile phone 21 can achieve two different closed states, a user may not utilize the sets of keys 26, 27 in accordance with aspects of the mobile phone's design while the mobile phone 21 is in either of the two closed states.

SUMMARY

The foregoing and other problems are overcome, and other advantages are realized, in accordance with the non-limiting and exemplary embodiments of these teachings. In particular, the exemplary embodiments of the invention provide techniques that enable access to the primary display screen and one or more sets of keys of a clamshell electronic device in a closed state by utilizing a second offset swivel axis.

In an exemplary aspect of the invention, a portable electronic device is provided including a first section comprising at least one key; and a second section pivotally connected to the first section by a movable connection, wherein the movable connection comprises a pivotal connection and a swivel connection, wherein the pivotal connection comprises a first fold axis, wherein the first section and the second section are adapted to rotate relative to each other about the first fold axis, wherein the swivel connection comprises a second offset swivel axis which is offset from a centerline of the second section, and wherein the first section and the second section are adapted to rotate relative to each other about the second offset swivel axis.

In another exemplary aspect of the invention, a method for operating a portable electronic device is provided comprising: providing a portable electronic device with a first section comprising at least one key, and a second section pivotally connected to the first section by a movable connection, wherein the movable connection comprises a pivotal connection and a swivel connection, wherein the pivotal connection comprises a first fold axis, wherein the first section and the second section are adapted to rotate relative to each other about the first fold axis, wherein the swivel connection comprises a second offset swivel axis which is offset from a centerline of the second section, and wherein the first section and the second section are adapted to rotate relative to each other about the second offset swivel axis, wherein the portable electronic device is in a first closed state having a first side of the second section facing an interior of the device; rotating the second section with regards to the first section about the first fold axis such that the portable electronic device achieves a first open state and the first side of the second section is facing a direction; rotating the second section with regards to the first section about the second offset swivel axis such that the first side of the second section is facing a direction about opposite from the direction it faced in the first open state; and rotating the second section with regards to the first section about the first fold axis such that the portable electronic device achieves a second closed state having the first side of the second section facing outwards from the device.

In a further exemplary aspect of the invention, a portable electronic device is provided including: a first section having at least one key; and a second section pivotally connected to the first section by a movable connection, wherein the movable connection comprises a pivotal connection and a swivel connection, wherein the pivotal connection comprises a first fold axis, wherein the first section and the second section are adapted to rotate relative to each other about the first fold axis, wherein the swivel connection comprises a second offset swivel axis which is offset from a centerline of the second section, and wherein the first section and the second section are adapted to rotate relative to each other about the second offset swivel axis, wherein the first fold axis is orthogonal to the second offset swivel axis, wherein the portable electronic device has at least two closed states, a first closed state in which a first side of the second section faces an interior of the device and a second closed state in which the first side of the second section faces outwards from the device and a portion of the at least one key is accessible.

In another exemplary aspect of the invention, at least one key on a portable electronic device is provided, wherein the at least one key comprises two faces on two sides of a first section of the device, wherein a first face of the at least one key is covered by a second section of the device when the device is in a first closed state, wherein the first face of the at least one key is not covered by the second section when the device is in a second closed state.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

It is desirable to provide techniques that enable a user to utilize keys of a portable clamshell type of electronic device while the device is in a closed state. As previously described, most keys or user input in conventional clamshell devices are essentially nonfunctional when in a closed state. The control keys and alphanumeric keys are hidden from view and unavailable to a user. In order to operate the device, the user must first open it and then maintain it in an opened state. By contrast, exemplary embodiments of the invention provide a method and apparatus whereby a user may have access to a clamshell device's primary display screen and one or more keys, even when the device is in a closed state. This accessibility enables the user to operate the device when in a closed state or folded condition.

Figures 1, 2:
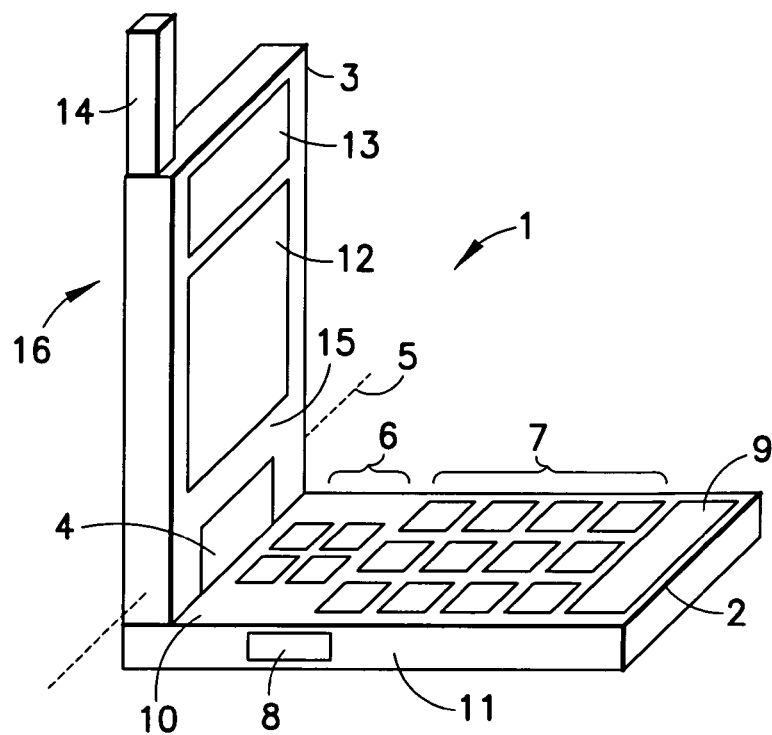
FIG. 1 is a perspective view of a conventional folding type of electronic device in a first open state.
FIG. 2 is a perspective view of the electronic device shown in FIG. 1 in a first closed state.
Figure 3:
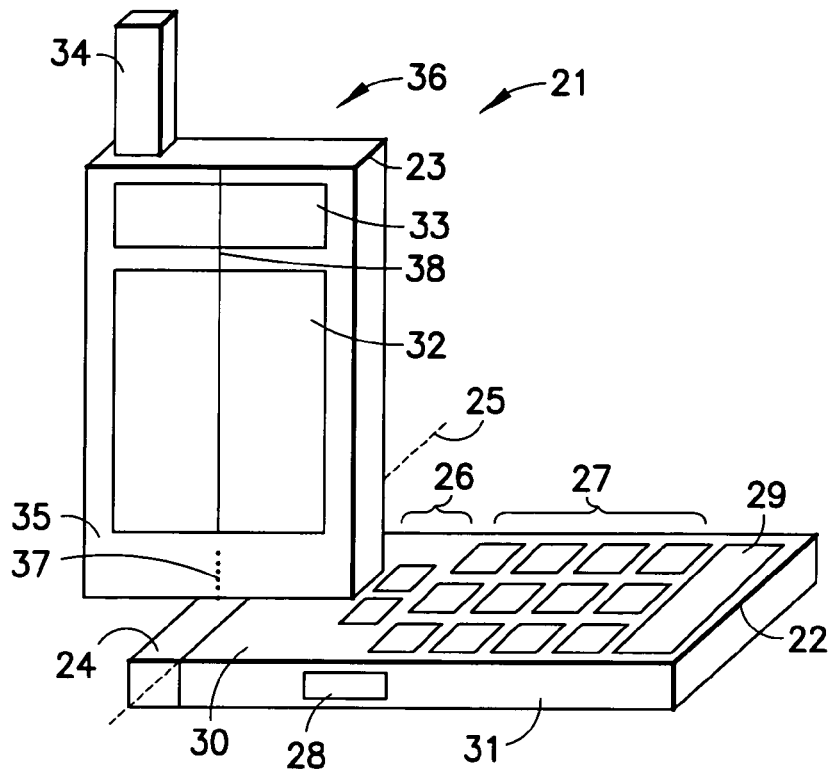
FIG. 3 is a perspective view of a conventional folding type of electronic device in a first open state.
Figure 4:
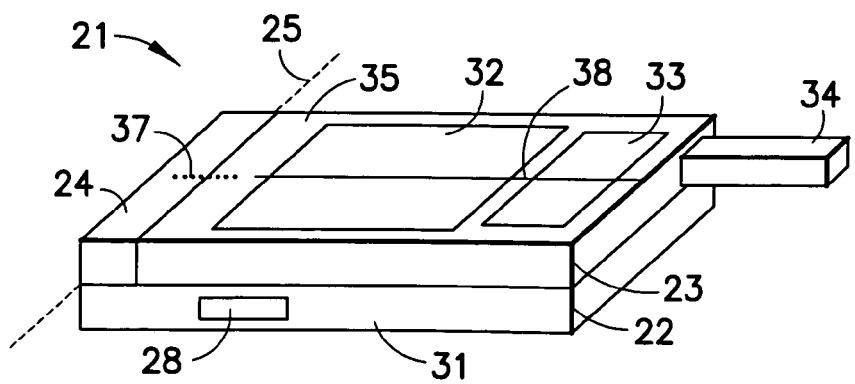
FIG. 4 is a perspective view of the electronic device shown in FIG. 3 in a second closed state.

Exemplary embodiments of this invention enable access to the primary display screen and one or more keys of a clamshell electronic device in a second closed state by utilizing a second offset swivel axis. Having the second swivel axis offset from a centerline of the appropriate section of the device enables the device to have two different closed states. A first closed state resembles that of FIG. 2, wherein the primary display screen and the keys are both covered and inaccessible. The second closed state of the device allows a user access not only to the primary display screen, as in FIG. 4, but also to the keys. This allows a user to operate a folding portable electronic device when it is in the second closed state.

Figure 5:
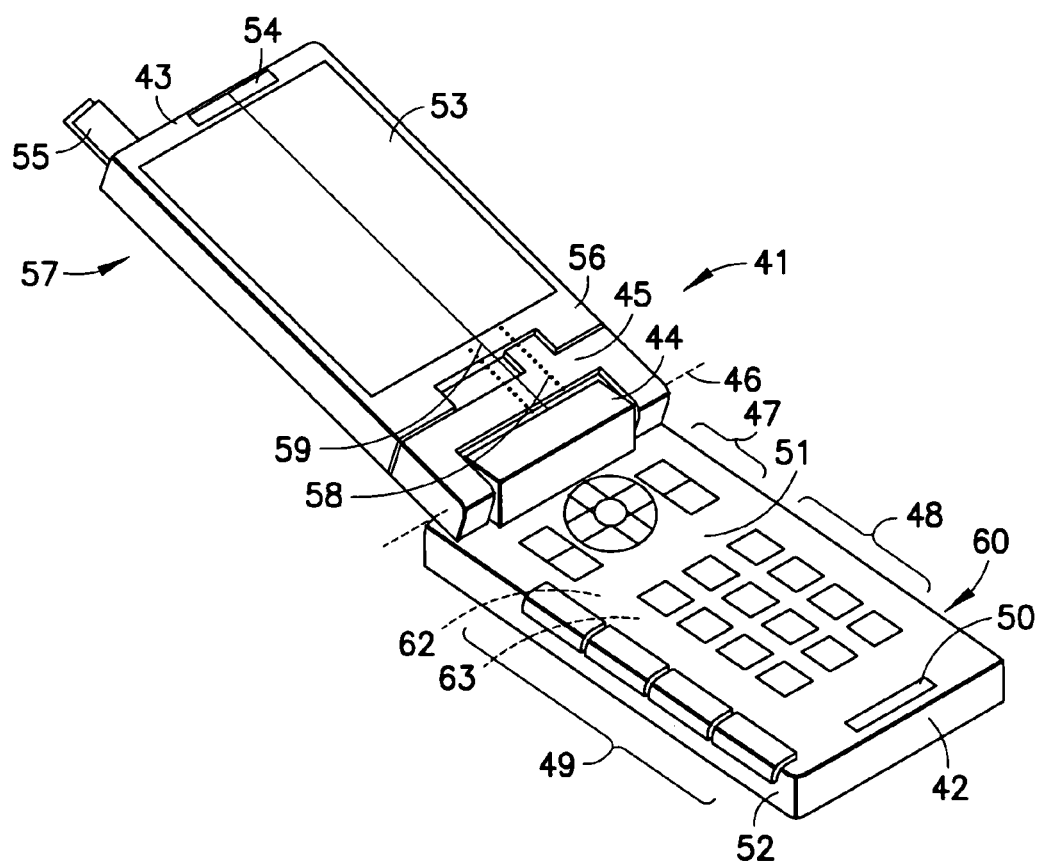
FIG. 5 is a perspective view of an exemplary embodiment of the invention in a first open state.

FIG. 5 is a perspective view of an exemplary embodiment of the invention in a first open state. In this embodiment, the device is a mobile phone 41. However, in alternate embodiments, the device may comprise a portable computer, a personal digital assistant (PDA), a text messaging device, a gaming device or any other suitable portable electronic device. The device 41 generally comprises a housing, a battery, a processor and a memory. The device 41 additionally comprises a transceiver and an antenna. Generally, the transceiver and the antenna are used for communication purposes.

The mobile phone 41 of FIG. 5 comprises two sections 42, 43 coupled together by a hinge assembly 44, 45. In the exemplary embodiment depicted in FIG. 5, the hinge assembly 44, 45 comprises two parts, a first hinge assembly part 44 and a second hinge assembly part 45. Note that this is a non-limiting example of the hinge assembly. Other exemplary embodiments of the invention may comprise different hinge assembly designs that may comprise different numbers, and designs, of hinge assembly parts. The first hinge assembly part 44 enables the two sections 42, 43 to fold together along a first fold axis 46, thus enabling the mobile phone 41 to achieve a closed state.

While in the first open state, as depicted in FIG. 5, the various features of the two sections 42, 43 are accessible. The first section 42 comprises three sets of keys 47, 48, 49 and a sound input 50. The three sets of keys 47, 48, 49 include a set of control keys 47, a set of alphanumeric keys 48, and a set of side keys 49. The control keys 47 are usually used to control the operations of the mobile phone 41. The alphanumeric keys 48 are typically employed when inputting information into the mobile phone 41. The information can include, but is not limited to, phone numbers and alphanumeric text, such as contact names associated with phone numbers or text messages. The side keys 49 may comprise control keys, alphanumeric keys or a combination of both types of keys. The sound input 50 is where the mobile phone 41 picks up sound to enable voice interaction or voice communication over the mobile phone 41, typically through a microphone located near or at sound input 50. The first section 42 additionally comprises a processor 62 and a transceiver 63, both located within the housing of the first section 42.

The control keys 47 and the alphanumeric keys 48 are both located on a first face 51 of the first section 42. In contrast, in this exemplary embodiment, the side keys 49 extend along two faces of the first section 42; the first face 51 and a second face 52. The first face 51 is orthogonal to the second face 52. This dual-face location of the side keys 49 enables the side keys 49 to be accessible to a user when the mobile phone 41 is in a first closed state shown in FIG. 6 or a second closed state, as can be seen more clearly in FIG. 7. Note also that a third face 60 of the first section 42 is located opposite the second face 52.

The second section 43 comprises a primary display screen 53, a sound output 54, and an antenna 55. The primary display screen 53 and the sound output 54 are located on a first face 56 of the second section 43. A second face 57 of the second section 43 is located opposite the first face 56 and can be seen more clearly in FIG. 6. The sound output 54 is where the mobile phone 41 emits sound in accord with aspects of its design. The sounds emitted by the sound output 54 can include, but are not limited to, voices from phone calls, alerts for text messaging, voice mail, and incoming calls, web surfing sounds, and sounds from game playing. Typically a speaker is located near or at the sound output 54.

The second section 43 is coupled to the second hinge assembly part 45 and is enabled to swivel about a second offset swivel axis 58. The second offset swivel axis 58 is offset from a longitudinal centerline 59 of the second section 43 and a longitudinal centerline of the first section 42. Having the second offset swivel axis 58 offset from the longitudinal centerline 59 enables the mobile phone 41 to achieve two significantly different closed states, as shown in comparing FIGS. 6 and 7.

Although the exemplary embodiment shown in FIG. 5 comprises three sets of keys 47, 48, 49, this is not required by the invention. Alternative exemplary embodiments of the invention may comprise greater or fewer sets of keys. Preferably at least one set of side keys is present. Although these groupings of keys are referred to as "sets" of keys, exemplary embodiments of the invention do not require that any set of keys comprise more than one key. That is, a set of keys may comprise as few as one key or as many keys as may fit within the various spatial, and technical, boundaries of exemplary embodiments of the invention.

Note that although a sound input 50, a sound output 54, and an antenna 55 are included in the mobile phone 41 of FIG. 5, these are components of conventional mobile phone designs. Alternate exemplary embodiments of the invention, particularly those exemplary embodiments not comprising a mobile phone design, may not include these and/or other components or component designs.

Figure 6:
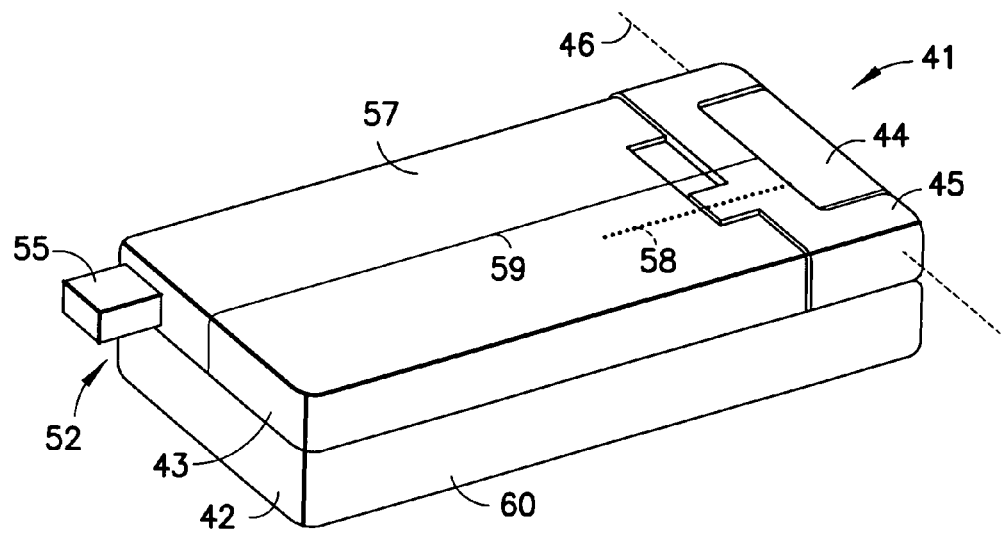
FIG. 6 is a perspective view of the exemplary embodiment shown in FIG. 5 in a first closed state.

FIG. 6 is a perspective view of the exemplary embodiment shown in FIG. 5 in a first closed state. The first closed state of this exemplary embodiment is similar to the first closed state of the conventional mobile phone designs shown in FIG. 2. To achieve the first closed state of FIG. 6 from the first open state of FIG. 5, the mobile phone 41 is manipulated in a certain manner. The two sections 42, 43 are folded together along the first fold axis 46, so enabled by the hinge assembly 44, 45. In achieving the first closed state, the first face 51 of the first section 42 faces the first face 56 of the second section 43. The second face 57 of the second section 43 forms a top side. As is apparent in FIG. 6, the set of control keys 47 and the set of alphanumeric keys 48 are inaccessible when the mobile phone 41 is in the first closed state. The set of side keys 49, although not visible due to the orientation of the mobile phone 41 shown in FIG. 6, is only partially covered by the second section 43. The portion of the side keys 49 extending along the second face 52 of the second section 43 is still accessible. In the first closed state, the primary display screen 53 is inaccessible as it faces the first face 51 of the first section 42. Although not employed in achieving the first closed state, the second offset swivel axis 58 is offset from the longitudinal centerline 59 of the second section 43 as shown in FIG. 6.

Figure 7:
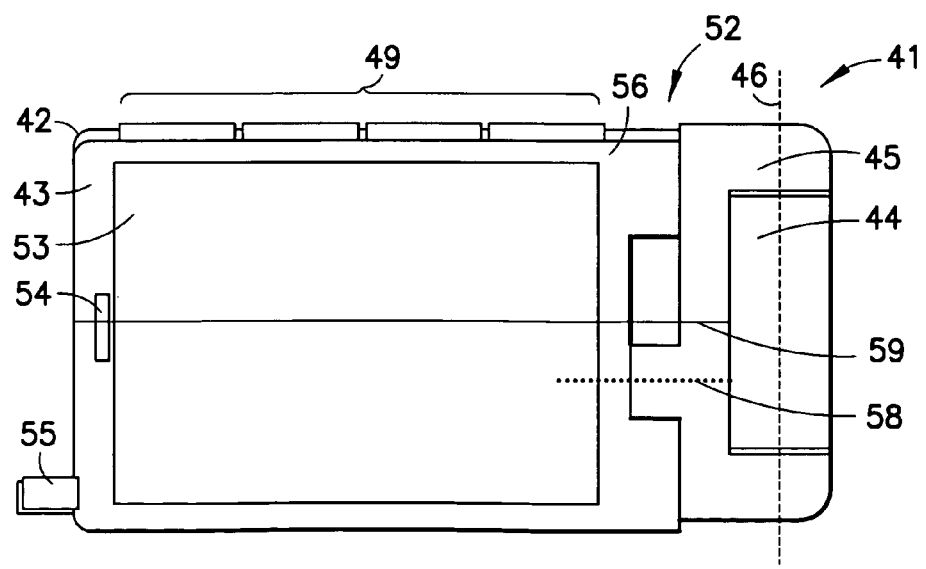
FIG. 7 is a perspective view of the exemplary embodiment shown in FIG. 5 in a second closed state.

FIG. 7 is a front side view of the exemplary embodiment shown in FIG. 5 in a second closed state. In achieving the second closed state from the first open state of FIG. 5, the second section 43 is rotated about the second offset swivel axis 58, so enabled by the second hinge assembly part 45. The primary display screen 53 is rotated about 180 degrees such that it is facing a direction opposite from the direction shown in FIG. 5. Then the second section 43 is folded along the first fold axis 46, so enabled by the hinge assembly 44, 45, until it faces directly opposite or on the first section 42. In so doing, the first face 51 of the first section 42 lies against the second face 57 of the second section 43. As can be seen in FIG. 7, when in the second closed state, both the side keys 49 and the primary display screen 53 are accessible to a user. The side keys 49 are more exposed in the second closed state versus the first closed state. More specifically, both sides of each of the major exterior sides of the keys are exposed. This accessibility enables a user to operate the mobile phone 41 in accord with aspects of its design.

Figure 8:
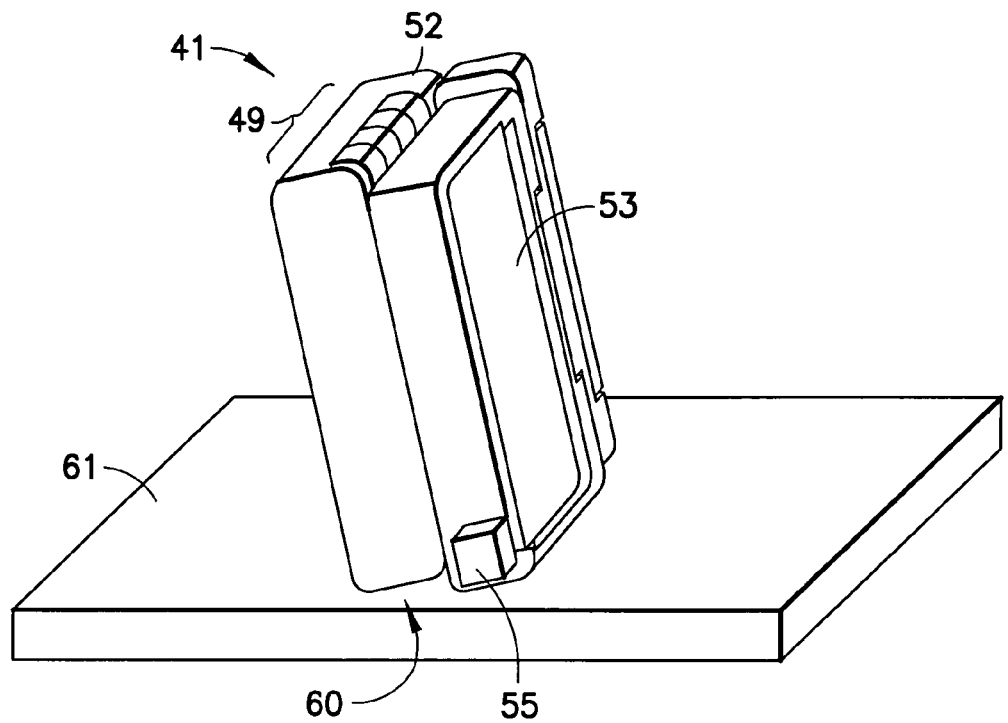
FIG. 8 is a perspective view of the exemplary embodiment shown in FIG. 5 in a second closed state standing on a surface, wherein the exemplary device is enabled to freely stand in the second closed state, without additional support, when placed on a flat, level surface.

FIG. 8 is a perspective view of the exemplary embodiment shown in FIG. 5 in the second closed state standing on a flat, level surface 61, wherein the mobile phone 41 is enabled to freely stand in the second closed state, without additional support, when placed on the flat, level surface 61. The third face 60 of the first section 42 is substantially facing the flat, level surface 61. When placed in the position shown in FIG. 8, the primary display screen 53 of the mobile phone 41 is not perpendicular to the flat, level surface 61. Rather, the primary display screen 53 is angled upwards, enabling a user to more easily see it. In such a manner, a user may observe the primary display screen 53, and have access to the set of side keys 49, without having to hold the device in hand or otherwise support it, e.g., by leaning it up against a nearby support structure. The configuration shown in FIG. 8 allows the device 41 to stand by itself at an angle on the surface and reveal control keys or a row of qwerty keys. This can be desirable such as when viewing a television or video broadcast or download, or for advanced messaging with a one-row qwerty keymat. The two bottom sides of the device 41 placed against the surface 61 are offset from each other in the second closed state to achieve the angle (as opposed to the substantially aligned positions shown in FIG. 6). In an alternate embodiment and additional support or movable stand could be provided on the housing.

Although the mobile phone 41 as depicted in FIGS. 5-8 comprises a first open state and two closed states, alternate exemplary embodiments of the invention may comprise multiple open states including more than one open state, and/or more than two closed states for example.

Alternate exemplary embodiments of the invention may comprise different connection means for achieving the multiple states, open and closed, of the invention. As a non-limiting example, the second offset swivel axis may not in fact be offset from a longitudinal centerline. Rather, the second swivel axis may be located along a longitudinal centerline but be present in conjunction with an additional slide mechanism, thus enabling the mobile device to achieve more than one closed state, in accordance with the teachings of this invention.

Figure 9:
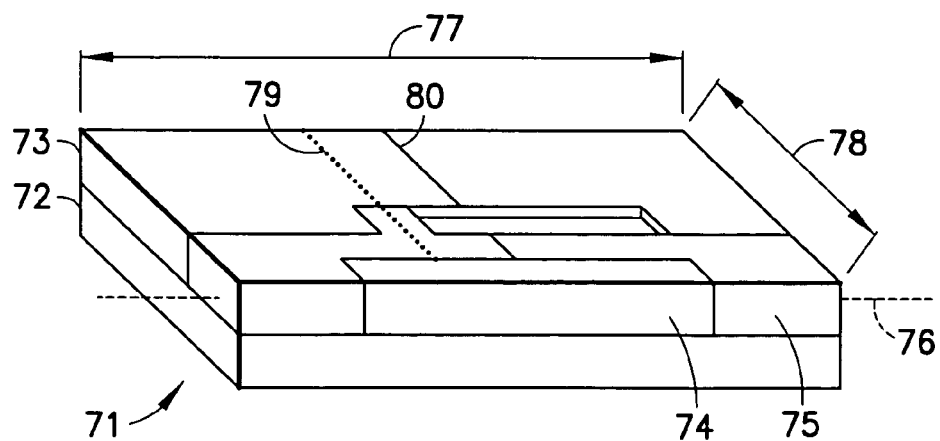
FIG. 9 is a perspective view of an alternate exemplary embodiment of the invention in a first closed state, wherein a first fold axis is located approximately parallel to a longer length of the two sections.

Although the second offset swivel axis 58 of the mobile phone 41 shown in FIGS. 5-8 is offset from the longitudinal centerline 59 of the second section 43, alternate exemplary embodiments of the invention may feature a second offset swivel axis which is offset from a different centerline of the second section. The precise location of the second offset swivel axis, as well as the particular centerline from which it is offset, may depend substantially on the orientation and location of the first fold axis. For example, given that the two sections are roughly rectangular in shape with one length being longer than the other, if the first fold axis is located along the longer length of the sections, the second offset swivel axis could be located offset from a centerline orthogonal to the longer length; the one parallel to the shorter length. FIG. 9 shows this more clearly.

FIG. 9 is a perspective view of an alternate exemplary embodiment of the invention in a first closed state. The exemplary embodiment shown is a mobile phone 71. The mobile phone 71 comprises a first section 72 and a second section 73. The first section 72 is coupled to the second section 73 by a hinge assembly 74, 75 comprising a first hinge assembly part 74 and a second hinge assembly part 75. The first hinge assembly part 74 enables the two section 72, 73 to fold together along a first fold axis 76 to achieve a closed state. The first fold axis 76 is located approximately parallel to a longer length 77 of the two sections, making the first fold axis 76 approximately perpendicular to a shorter length 78. A second offset swivel axis 79 is present, enabling the mobile phone 71 to achieve a second closed state substantially similar to the one shown in FIG. 7. The second offset swivel axis 79 is offset from a centerline 80 of the second section 73. The centerline 80 approximately bisects the longer length 77 of the second section 73 and runs roughly parallel to the shorter length 78, running roughly perpendicular to the longer length 77.

As can be observed, particularly by comparing the mobile phone 71 illustrated in FIG. 9 with the mobile phone 41 shown in FIG. 6, exemplary embodiments of this invention may take on a variety of different designs. The two referred to are simply two non-limiting examples. Alternate embodiments may feature different sizes, shapes and designs of sections, in addition to different locations and orientations of movement axes. Those skilled in the art will appreciate the variety of designs available for such additional embodiments.

Figure 10:
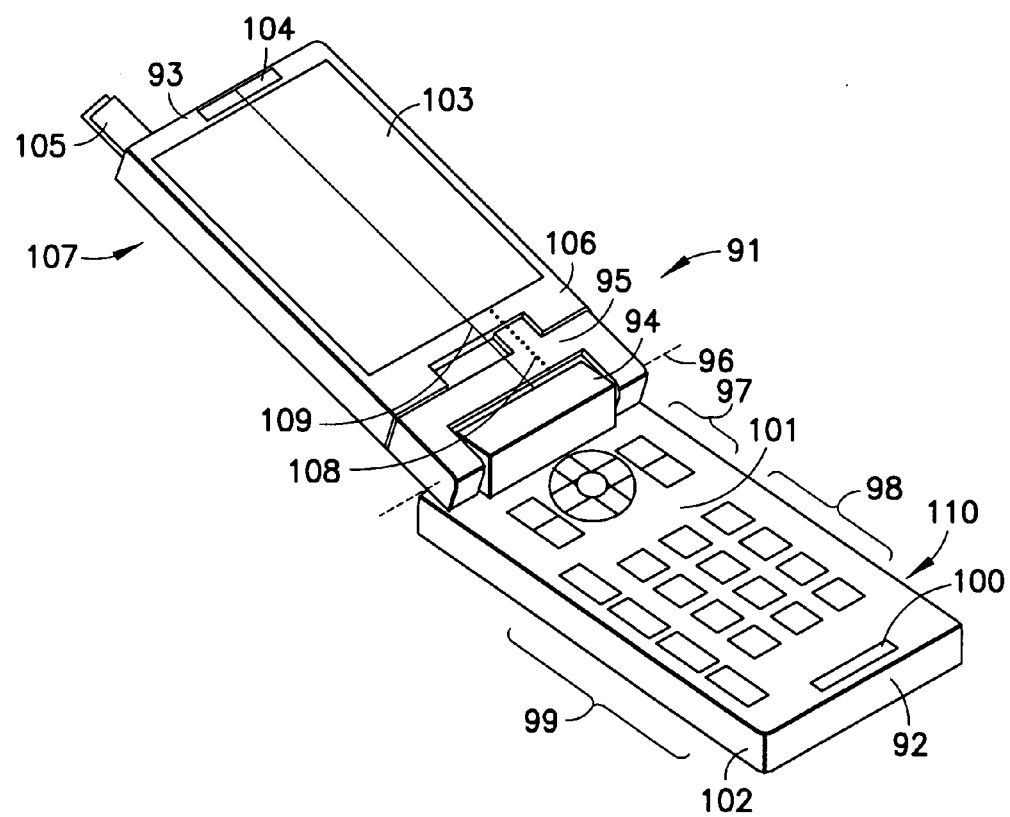
FIG. 10 is a perspective view of an alternate exemplary embodiment of the invention in a first open state, wherein the side keys are located on one face of the device.

FIG. 10 is a perspective view of another alternate exemplary embodiment of the invention in a first open state. The embodiment shown in FIG. 10 is a mobile phone 91. The mobile phone 91 comprises two sections 92, 93 coupled together by a hinge assembly 94, 95. The hinge assembly 94, 95 comprises two parts, a first hinge assembly part 94 and a second hinge assembly part 95. The first hinge assembly part 94 enables the two sections 92, 93 to rotate relative to each other along a first fold axis 96. The first section 92 comprises three sets of keys 97, 98, 99 and a sound input 100. The three sets of keys 97, 98, 99 include a set of control keys 97, a set of alphanumeric keys 98, and a set of side keys 99. The three sets of keys 97, 98, 99 are all located on a first face 101 of the first section 92. A second face 102 of the first section 92 is orthogonal to the first face 101. Unlike the mobile phone 41 of FIG. 5, in this exemplary embodiment, the side keys 99 extend along only one face of the first section 92; namely the first face 101. The side keys 99 do not extend along both the first face 101 and the second face 102. A third face 110 lies opposite the second face 102. A second section 93 comprises a primary display screen 103, a sound output 104, and an antenna 105. The primary display screen 103 and the sound output 104 are located on a first face 106 of the second section 93. A second face 107 of the second section 93 is located opposite the first face 106. The second section 93 is coupled to the second hinge assembly part 95 and is enabled to swivel about a second offset swivel axis 108. The second offset swivel axis 108 is offset from a longitudinal centerline 109 of the second section 93. Having the second offset swivel axis 108 offset from the longitudinal centerline 109 enables the mobile phone 91 to achieve two significantly different closed states, substantially similar to those shown in FIGS. 6 and 7.

Although the exemplary embodiment shown in FIG. 10 has the side keys 99 extending along the first face 101 of the first section 92, this is a non-limiting example. An alternative embodiment of the invention may have the side keys extending along a different face of the first section, such as the second face 102 identified in FIG. 10. Those skilled in the art will appreciate the available locations for the side keys in alternate embodiments of the invention.

Figure 11:
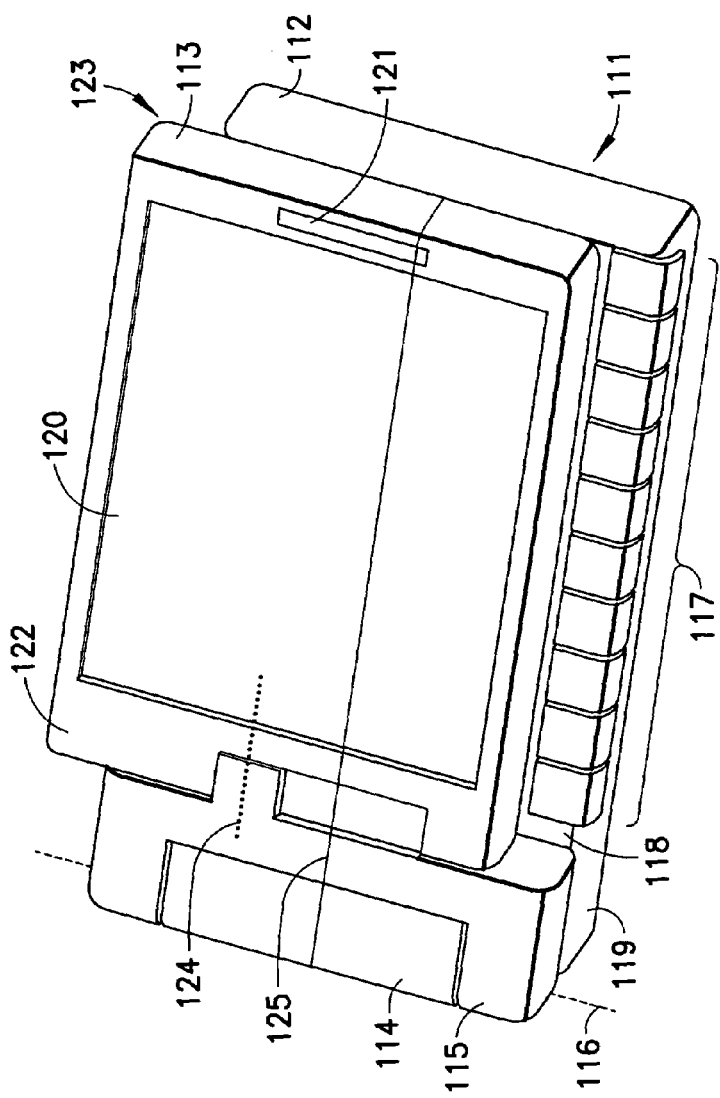
FIG. 11 is a perspective view of an alternate exemplary embodiment of the invention in a second closed state, wherein a row of side keys is accessible when the exemplary device is in the second closed state.

FIG. 11 is a perspective view of another alternate exemplary embodiment of the invention in a second closed state. The exemplary embodiment shown in FIG. 11 is a mobile phone 111. The mobile phone 111 comprises two sections 112, 113 coupled together by a hinge assembly 114, 115. The hinge assembly 114, 115 comprises two parts, a first hinge assembly part 114 and a second hinge assembly part 115. The first hinge assembly part 114 enables the two sections 112, 113 to rotate relative to each other along a first fold axis 116. This enables the mobile phone 111 to be reconfigured between open and closed states. The first section 112 comprises a set of side keys 117 and a sound input (hidden from view). The side keys 117 extend along two faces 118, 119 of the first section 112; a first face 118 and a second face 119. The second face 119 is orthogonal to the first face 118. A second section 113 comprises a primary display screen 120 and a sound output 121. The primary display screen 120 and the sound output 121 are located on a first face 122 of the second section 113. A second face 123 of the second section 113 is located opposite the first face 122. The second section 113 is coupled to the second hinge assembly part 115 and is enabled to swivel about a second offset swivel axis 124. The second offset swivel axis 124 is offset from a longitudinal centerline 125 of the second section 113 and a longitudinal centerline of the first section 112. Having the second offset swivel axis 124 offset from the longitudinal centerline enables the mobile phone 111 to achieve two significantly different closed states, including a first closed state substantially similar to the one shown in FIG. 6 and a second closed state shown in FIG. 11. The mobile phone 111 can also achieve a first open state substantially similar to the one shown in FIG. 5.

By providing the set of side keys 117 in a row, the user has access to a number of keys when the mobile phone 111 is in the second closed state as shown in FIG. 11. This enables the user to operate the mobile phone 111 in accord with aspects of its design. As a non-limiting example of this functionality, the set of side keys 117 could be designed to enable a user to create and send text messages with the mobile phone 111 when it is in the second closed state. The set of side keys 117 may comprise control keys, alphanumeric keys, or a combination of control keys and alphanumeric keys, as non-limiting examples.

Figure 12:
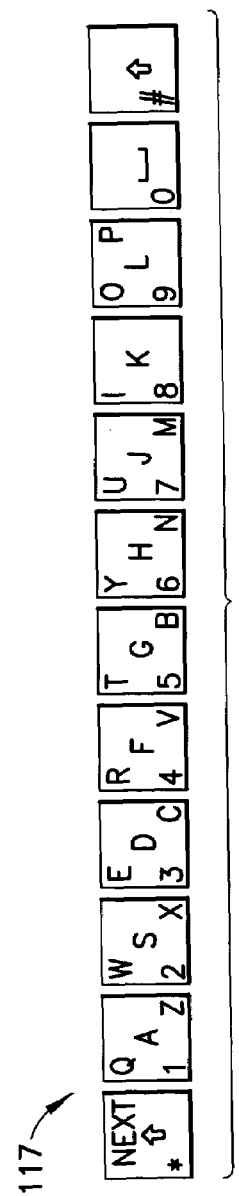
FIG. 12 illustrates an example configuration of the row of keys in FIG. 9.

FIG. 12 illustrates an example configuration of the row of keys 117 in FIG. 11. The configuration shown is a QWERTY row of keys wherein the placement of the letters on the keys, both horizontally and vertically, is modeled on the key placement of a conventional United States keyboard. Note that this is a non-limiting example and other configurations, both with respect to letter and number placement and the number of keys, are available for use in accord with exemplary embodiments of this invention.

Figure 13:
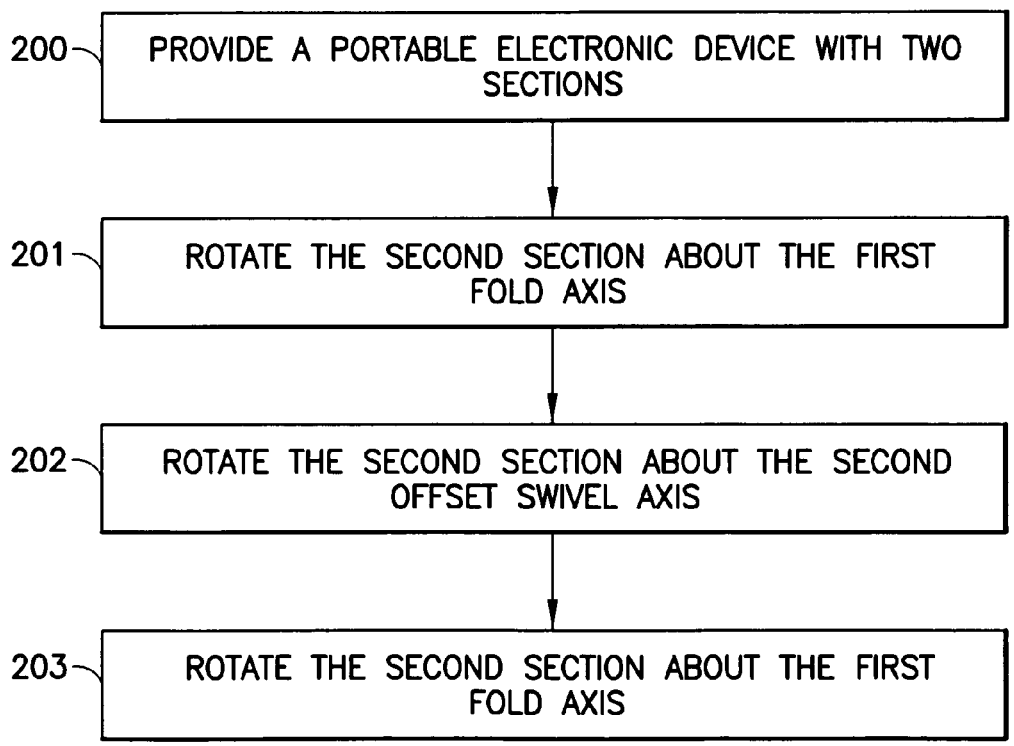
FIG. 13 shows a flowchart illustrating an exemplary method for practicing the exemplary embodiments of this invention.

FIG. 13 shows a flowchart illustrating an exemplary method for practicing the exemplary embodiments of this invention. As illustrated by block 200, the portable electronic device can be provided with a first section comprising at least one key, and a second section pivotally connected to the first section by a movable connection, wherein the movable connection comprises a pivotal connection and a swivel connection, wherein the pivotal connection comprises a first fold axis, wherein the first section and the second section are adapted to rotate relative to each other about the first fold axis, wherein the swivel connection comprises a second offset swivel axis which is offset from a centerline of the second section, and wherein the first section and the second section are adapted to rotate relative to each other about the second offset swivel axis, wherein the portable electronic device is in a first closed state having a first side of the second section facing an interior of the device. As illustrated by block 201, the second section can be rotated with regards to the first section about the first fold axis such that the portable electronic device achieves a first open state and the first side of the second section is facing a direction. As illustrated by block 202, the second section can be rotated with regards to the first section about the second offset swivel axis such that the first side of the second section is facing a direction about opposite from the direction it faced in the first open state. As illustrated by block 203, the second section can be rotated with regards to the first section about the first fold axis such that the portable electronic device achieves a second closed state having the first side of the second section facing outwards from the device.

The method illustrated in FIG. 13 shows how to shift a portable electronic device, in accord with exemplary embodiments of this invention, from a first closed state, where the primary display screen faces an interior of the device, to a first open state. The method then shows how to reconfigure the device from the first open state to a second closed state where the primary display screen faces outwards from the device. The method may be employed in reverse sequence to reconfigure the device from the second closed state to the first closed state.

In general, the various embodiments of the portable electronic device can include, but are not limited to, cellular telephones, personal digital assistants (PDAs), portable computers, image capture devices such as digital cameras, gaming devices, and music storage and playback appliances, as well as portable units or terminals that incorporate combinations of such functions.

Various modifications and adaptations may become apparent to those skilled in the relevant arts in view of the foregoing description, when read in conjunction with the accompanying drawings and the appended claims. For example, the hinge assembly need not comprise two separate components. As a non-limiting example, the hinge assembly could comprise one hinge assembly component which enables two axes of movement. Furthermore, the symbology employed to identify the nature and function of the keys, both with respect to the control keys and alphanumeric keys that may be present on the device, may be any symbology or language. As additional non-limiting examples beyond English, the symbology employed may be Hindi, Kanji or Chinese. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the present invention, and not in limitation thereof.

What is claimed is:

1. A portable electronic device comprising:
a first section comprising at least one key; and
a second section pivotally connected to the first section by a movable connection wherein the movable connection comprises a pivotal connection and a swivel connection, wherein the pivotal connection comprises a first fold axis, wherein the first section and the second section are adapted to rotate relative to each other about the first fold axis, and wherein the first section and the second section are adapted to rotate relative to each other about the second offset swivel axis, wherein the swivel connection comprises a second offset swivel axis which is laterally offset from a centerline of the second section, and wherein the first section and the second section are adapted to rotate relative to each about the second offset swivel axis,
wherein the device comprises at least two closed states including a first closed state in which a first side of the second section faces an interior of the device and a second closed state in which the first side of the second section faces outwards from the device.

2. A device as in claim 1 wherein at least a portion of the at least one key is accessible when the device is in a first closed state.

3. A device as in claim 1 wherein the centerline of the second section is a longitudinal centerline of the second section such that the second offset swivel axis is offset from the longitudinal centerline of the second section.

4. A device as in claim 1 wherein at least a portion of the at least one key is accessible when the device is in the second closed state.

5. A device as in claim 4 wherein the at least one key comprises a plurality of keys aligned in a row.

6. A device as in claim 5 wherein the plurality of keys comprise a QWERTY row of keys.

7. A device as in claim 1 wherein, when the device is in the second closed state, the device is adapted to stand freely at an angle when placed on a flat, level surface with no additional support.

8. A device as in claim 1 wherein the first fold axis is orthogonal to the second offset swivel axis.

9. A device as in claim 1 wherein the device is a mobile telephone comprising a transceiver.

10. A device as in claim 1 wherein the second offset swivel axis is at a first distance from a first lateral side of the second section, wherein the second offset swivel axis is at a second distance from a second lateral side of the second section, and wherein the first distance is greater than the second distance.

11. A method comprising:
providing a portable electronic device with a first section comprising at least one key, and a second section pivotally connected to the first section by a movable connection, wherein the movable connection comprises a pivotal connection and a swivel connection, wherein the pivotal connection comprises a first fold axis, wherein the first section and the second section are adapted to rotate relative to each other about the first fold axis, wherein the swivel connection comprises a second offset swivel axis which is offset from a centerline of the second section, and wherein the first section and the second section are adapted to rotate relative to each other about the second offset swivel axis, wherein the portable electronic device comprises a first closed state having a first side of the second section facing an interior of the device, and wherein a second side of the second section is substantially adjacent to the first section when the device is in the first closed state;
rotating the second section with regard to the first section about the first fold axis such that the portable electronic device achieves a first open state and the first side of the second section is facing a first outward direction;

rotating the second section with regard to the first section about the second offset swivel axis such that the first side of the second section faces a second different direction; and rotating the second section with regard to the first section about the first fold axis such that the portable electronic device achieves a second closed state having the first side of the second section facing outwards from the device, wherein the second side of the second section is substantially offset from the first section when the device is in the second closed state.

12. A method as in claim 11 further comprising reconfiguring the portable electronic device from the second closed state to the first closed state by performing the steps of claim 11 in substantially reverse succession.

13. A method as in claim 11 further comprising placing the portable electronic device on a flat, level surface, when the portable electronic device is in the second closed state, to allow the portable electronic device to stand freely with no additional support on the flat, level surface at an angled position.

14. A method as in claim 11 wherein the second side of the second section is substantiality offset from the first section in a direction substantially perpendicular to the centerline of the second section when the device is in the second closed state.

15. A device comprising:
a first section comprising at least one key, and
a second section pivotally connected to the first section by a movable connection, wherein the movable connection comprises a pivotal connection and a swivel connection, wherein the pivotal connection comprises a first fold axis, wherein the first section and the second section are adapted to rotate relative to each other about the first fold axis, wherein the swivel connection comprises a second offset swivel axis which is offset from a centerline of the second section in a direction substantially parallel to the first fold axis, and wherein the first section and the second section are adapted to rotate relative to each other about the second offset swivel axis, wherein the first fold axis is orthogonal to the second offset swivel axis, wherein the device has at least two closed state including a first closed state in which a first side of the second section faces an interior of the device and a second closed state in which the first side of the second section faces outwards from the device and a portion of the at least one key is accessible,
wherein the portion of the at least one key that is accessible when the device is in the second closed state extends along a lateral side edge of the first section.

16. A device comprising:
a housing comprising a first section movably connected to a second section, wherein the second section is movable relative to the first section between a first closed state substantially covering a first exterior major side of the first section and a second different closed state substantially covering the first exterior major side of the first section; and at least one depressible key on the first section, wherein the at least one key comprises a first side at the first exterior major side of the first section add a second side at a second exterior side of the first section, wherein the first side of the at least one key is covered by the second section of the housing when the housing is in the first closed state, and wherein the first side of the at least one key is not substantially covered by the second section when the housing is in the second closed state,
wherein the first section is connected to the second section by a movable connection comprising a pivotal connection and a swivel connection, wherein the pivotal connection comprises a first fold axis, wherein the first section and the second section are adapted to rotate relative to each other about the first fold axis, wherein the swivel connection comprises a second offset swivel axis perpendicular to the first fold axis and which is offset from a longitudinal centerline of the second section, and wherein the first section and the second section are adapted to rotate relative to each other about the second offset swivel axis.

17. A device as in claim 16 wherein the second side of the at least one key is not covered by the second section when the housing is in the first closed state.

* * * * *